REMOTE CLOCK SYSTEM

Filed Jan. 2, 1968

4 Sheets-Sheet 1

Inventor:
Robert A. Kulick
BY ROBERT L. KAHN ATTORNEY

March 3, 1970 R. A. KULICK 3,498,049

REMOTE CLOCK SYSTEM

Filed Jan. 2, 1968 4 Sheets-Sheet 2

Inventor: Robert A. Kulick
By Robert L. Kahn
Atty.

Inventor:
Robert A. Kulick
BY ROBERT L. KAHN
ATTORNEY

REMOTE CLOCK SYSTEM

Inventor:
Robert A. Kulick
BY ROBERT L. KAHN
ATTORNEY 3,498,049
Patented Mar. 3, 1970

1

2

3,498,049

REMOTE CLOCK SYSTEM

Robert A. Kulick, Streamwood, Ill., assignor to Du Kane Corporation, St. Charles, Ill., a corporation of Delaware Filed Jan. 2, 1968, Ser. No. 694,946
Int. Cl. G04c *13/00*
U.S. Cl. 58—24 17 Claims

ABSTRACT OF THE DISCLOSURE

An electric clock system including master and remote clocks has each remote clock powered by an individual synchronous electric motor energized from its own local electric power source. In such a system, a remote clock receives reset electric pulses over a signal circuit from a master clock. The pattern of such pulses is as an example a 57 second pulse every hour and every twelve hours (or twenty-four) successive similar pulses spaced 63 seconds apart are received for some twenty odd minutes for major reset. When reset is not required at a remote clock embodying the invention, all time corrective physical movement of remote clock parts is reduced to two cam followers sliding along two cam surfaces, of such mechanical simplicity and ruggedness, that the reset pulse sensing means inherently has a long useful life. When reset is required, the sensing means unlocks suitable mechanical means and permits reset pulses to control remote clock mechanism for reset.

This invention relates to a remote clock system operating in an electric clock system comprising a master clock and one or more secondary or remote clocks, each remote clock being individually powered by its synchronous A.C. electric motor energized from its individual electric source providing frequency controlled alternating current useful for both power and timekeeping purposes. While the remote clock system herein disclosed is useful with any master clock having a suitable control signal pattern, it is particularly useful with the master clock system disclosed in the co-pending application of A. N. Montgomery, Ser. No. 558,894, filed June 20, 1966, commonly assigned with the present application and issued on Apr. 8, 1969 as Patent 3,437,767.

A system including master and secondary or remote clocks has wide application for schools, industrial and office facilities and other locations. The master clock has remote clock time correction functions and may include additional control functions such as ringing of bells or alarms. Remote clocks under master clock control are useful for time indication. Insofar as time-keeping accuracy is concerned, both master and remote clocks are generally dependable as long as each synchronous electric motor is continuously and properly energized. Such a motor normally operates synchronously or not at all. The principal difficulty in regard to accuracy of time indication for master or remote clocks arises from electric power interruption. A master clock may have an auxiliary spring motor drive to keep it on time over a short power failure. A remote clock will stop every time its power is interrupted. In case of power failure, an inspection of the master clock may be made to determine whether such clock is correct and if not, manual reset of the master clock becomes necessary. Remote clocks may be reset by signal pulses from the master clock distributed to remote clocks by signal circuits.

In the case of remote clocks, the synchronous electric motor and conventional clock gear drive between motor and time indicating hands on the face of the clock generally have a long useful life. A remote clock, in the clock system to which this invention pertains, customarily receives clock reset signal pulses at regular intervals (such as hourly) as part of the master clock monitoring function.

Reset signals from a master clock are transmitted over a signal circuit to remote clocks in a predetermined time pattern. While there may be differences in reset signal time patterns, such clock systems to which the present invention relates have a regular time schedule of reset signals. Remote clocks in such prior systems have reset calling means controlled by and moving with remote clock timekeeping members and reset pulse controlled sensing means for timing reset occurrence of the remote clock, if reset is called for.

It is necessary in such prior systems to provide a functional connection between the remote clock controlled reset calling or rejecting means (always in fixed time relation to the remote clock) and the reset pulse controlled means for what is essentially an interrogation to determine if the remote clock is or is not calling for reset. The functional connection between such pulse controlled means together with reset calling (or reset rejection) means constitutes a remote clock sensing means which interrogates a remote clock for reset and governs the application of reset when called for by such remote clock.

In remote clocks to which this invention pertains, it has been customary to rely upon one or more gears as part of the remote clock sensing means. The sensing and interrogation function, occurring with every reset pulse from a master clock, has involved mechanical movement of delicate members and generally engagement and disengagement of gearing. With reset pulses occurring hourly (or other period) the wear and tear of the mechanical parts involved in reset signal response at a remote clock, irrespective whether reset takes place, is substantial. This affects the useful life of a remote clock. The termination of such useful clock correction or reset life may be masked by lack of power failure and becomes apparent when an emergency resulting from a power failure occurs.

In accordance with the present invention, sensing and remote clock interrogation is localized in two cams and cam followers interlocked with an electro-magnetic means energized by reset signal pulses. The cams and followers are inherently subject to little if any wear, even though such cams are rotating continuously with remote clock operation.

The position of either or both cam followers at signal reception determines whether reset is or is not called for. If no reset is required, no significant physical movement of any mechanical part in response to signal energization of said electro-magnetic means takes place. Thus as long as no reset is necessary, no special mechanical movement of any part takes place, the cams and followers functioning normally. When reset is called for because of the abnormal cam follower position during signal reception, then and only then does physical movement of members other than said cams and followers occur. A remote clock embodying the invention will have a long useful operating life, not terminated necessarily by any portion thereof.

For convenience in describing the clock schedule for reset signals, an assumed master clock reset signal pattern will be given by way of example. Fifty-seven minutes and three seconds (57:03) after each hour, one 57 second continuous reset signal pulse will be sent from a master clock. Every twelve hours (such as at 4:57:03 and referred to briefly as the long 5:00 o'clock reset signal period) an especially long reset signal period will start with the usual 57 second signal, to 4:58:00, then no signal to 4:59:03, followed by a 57 second signal, then 63 second no signal pause, then a 57 second signal, alternating with 63 second no signal pause, until 5:20:00, at which time the long reset signal period ends. In a remote clock system embodying the present invention, and by way of example only, one 57 second signal pulse permitted the remote clock to correct (by clock hand speed-up) one hour less 2 minutes. In other words, a 57 second signal pulse could cause as much as a 58 minute speed-up in the remote clock. In all discussions of remote clock reset, it should be understood that all clock correcting movements are in the direction of clock advance and any clock deviation is with reference to how much a remote clock must be advanced to be on time with the master clock. As an extreme example, a remote clock indicating 12:01:00 when the master shows 12:00:00 is regarded as 11 hour and 59 minutes slow.

In the particular reset signal system disclosed here, a long reset signal period (the 5 o'clock reset) when utilized to reset remote clock by more than an hour will require the 57 second signal, following the end of the long signal period, for final minute correction.

Figures 1, 1A, 1B:
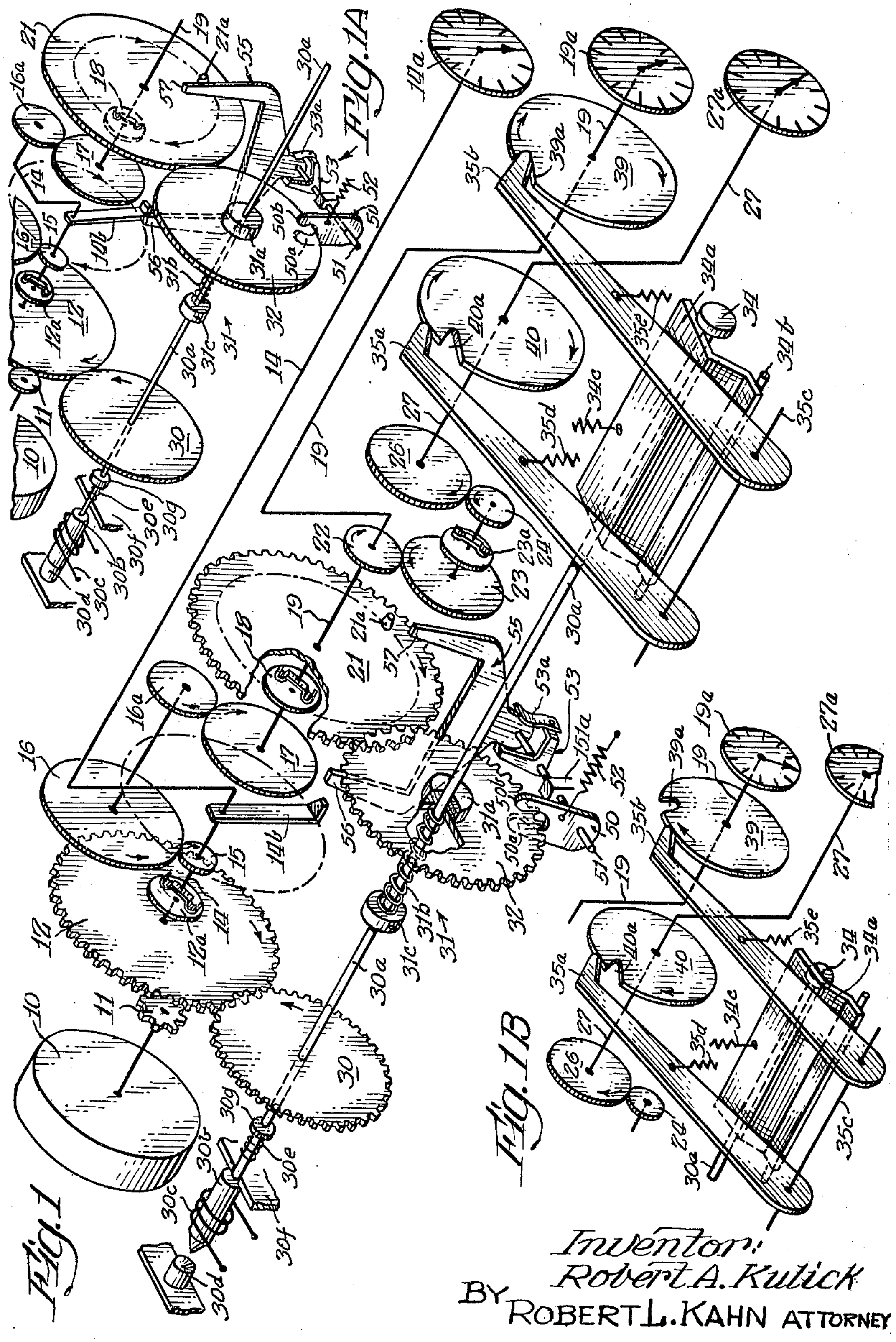
FIG. 1 is a perspective diagrammatic view of a system embodying the invention, the parts being arranged for clarity of illustration and the interlock means being illustrated in an interlock position.
FIGS. 1A and 1B are respectively portions of the showing of FIG. 1 but illustrating the parts in a somewhat different position.

Referring first to FIG. 1, motor 10 provides power for driving the various clock gears. Motor 10 is of the synchronous type and is available in a large variety of sizes and output speeds. Motor 10 is connected through suitable gear reduction means (not shown) to drive pinion 11. Pinion 11 meshes with gear 12 which makes one revolution per minute. Normally the coupling to gear 12 from motor 10 is sufficiently good so that as long as motor 10 is operating, gear 12 will rotate. Seconds gear 12 is coupled through friction clutch **12*a* to seconds arbor 14 carrying seconds hand 14*a*. Friction clutch 12*a* can slip enough to permit seconds arbor 14 carrying seconds hand 14*a* to be stopped without stopping seconds gear 12. Seconds arbor 14 carries one part of a seconds arbor detent means, here illustrated as second stop finger 14*b***.

In the system as disclosed, continued rotation of seconds gear 12 at reset is necessary since an auxiliary gear drive, when active, derives its power from seconds gear 12 which, in turn, is driven from motor 10. It is possible to derive reset drive power from any gear ahead of seconds gear 12. The arrangement illustrated is convenient. It is necessary that seconds stop finger **14*b* should be in rotary alignment with seconds hand 14*a*. Accordingly, substantial friction should maintain seconds arbor 14, seconds hand 14*a* and stop finger 14*b*** in desired relationship.

Seconds arbor 14 carries pinion 15 meshing with gear 16, driving pinion **16*a* which meshes with minute drive gear 17, this being coupled through friction clutch 18 to minute arbor 19 carrying minute hand 19*a*. Minute arbor 19 carries minute reset driven gear 21 and pinion 22 both secured to arbor 19. Pinion 22 meshes with gear 23 which is coupled through friction clutch 23*a* to a stub shaft carrying pinion 24. Friction clutch 23*a* is quite stiff and is provided for permitting factory adjustment between the hour and minute shafts for insuring proper and accurate relative timing after clock assembly. Relative movement between gear 23 and its shaft may be obtained by special tools for slipping clutch 23*a*. Other than factory adjustment, clutch 23*a* is too stiff to yield during clock operation after the clock leaves the factory. Pinion 24 engages hour arbor drive gear 26 on hour arbor 27. The combination of gear 23 and pinion 24 provides for the necessary speed reduction between minute and hour arbors. In a practical clock construction, the shaft carrying gear 23 and friction clutch 23*a*** will be disposed to be readily accessible from outside of the clock movement after assembly and thus makes it convenient for final adjustment at the factory.

It is understood that second, minute and hour arbors are concentric and pass through a clock face with hands on such arbors for indicating time in conventional fashion. For convenience, a 12 hour clock is assumed. However, 24 hour clock operation is obtainable by simple changes in gear ratios.

Minute reset driven gear 21 carries one part of a detent means, specifically finger **21*a*. It is immaterial whether finger 21*a* is on minute arbor 19 or reset driven gear 21. It is important for normal clock reset operation that fingers 14*b* and 21*a*** remain in fixed rotary positions on their respective arbors.

Referring back to seconds drive gear 12, an auxiliary gear reset drive, normally inopreative, is provided. Auxiliary drive gear 30 has shaft or spindle **30*a* which is coupled through friction clutch 31 to minute reset drive gear 32. A simple friction coupling between spindle 30*a* and gear 32 may be obtained by having collar 31*a* on spindle 30*a* at one side of gear 32, which gear is loose on spindle 30*a*. On the other side of gear 32 is coil spring 31*b* compressed between the side of gear 32 and collar 31*c* on spindle 30*a*. Other friction couplings used in the clock art may also be used. The coupling between drive gear 30 and minute reset gear 32 is sufficiently good so that power for reset can flow. Clutch action at gears 30 and 32 is obtained by bodily moving spindle 30*a* longitudinally so that these auxiliary gears go into or out of mesh with gears 12 and 21**.

The gear ratios for auxiliary gears 30 and 32 and gears 12 and 21 are such that minute arbor 19 can be driven at an accelerated rate. Thus, as an example, the auxiliary drive from seconds gear 12 can drive minute reset driven gear 21 through 360° in about 40 seconds of actual time. Seconds arbor 14, when driven, will always be driven at normal rate. When minute reset driven gear 21 is going at reset rate (even faster than the seconds gear), clutch 18 will slip. This is also true when minute reset driven gear 21 is temporarily locked against rotation, as will be explained later.

The lateral bodily movement of auxiliary drive gears 30 and 32 for reset operation is obtained by the following means. Spindle **30*a* carries armature plunger 30*b* cooperating with a solenoid having winding 30*c* upon which reset signal pulses from a master clock are impressed. Plunger 30*b* has its tip for engagement with stop 30*d* carried by a clock plate, engagement occurring after winding 30*c* is energized and armature 30*b* is free to move. Gears 30 and 32 are biased to an inactive position by spring 52 to be later described. Coil spring 30*e* about spindle 30*a* is disposed between collar 30*g* on spindle 30*a* and stationary abutment 30*f* through which spindle 30*a* can extend. In the normal biased position of spindle 30*a*, when gears 30 and 32 are inactive, spring 30*e* is loose and is not compressed between collar 30*g* and abutment 30*f*. In fact, it is preferred to have the normal uncompressed length of coil spring 30*e* along spindle 30*a* sufficiently short so that spindle 30*a* can be moved longitudinally in response to the magnetic pull on armature 30*b* sufficiently to develop a strong magnetic pull before spring 30*e* begins to be compressed. Thus when energization of winding 30*c* occurs, a weak magnetic force on armature 30*b* may suffice to initiate spindle travel along the spindle axis. This avoids the necessity for strong solenoid action when gears 30 and 32 are in position for meshing with gears 12 and 21. If the various gears cannot mesh, due to tooth interference, the maximum armature pull on spindle 30***a* will be enough for meshing to occur without damage or excessive force. Gear 32 can also accommodate itself to gear 21 due to the mounting of gear 32 on spindle 30*a*. When winding 30*c* is energized, armature plunger 30*b* is subjected to a pull tending to move the same into winding 30*c* against the bias of spring 52 and later against coil spring 30*e* and position auxiliary drive gears 30 and 32 in mesh with gears 12 and 21. This action may or may not occur, depending upon the lockout means to be described. If no physical movement of plunger 30*b* is permitted, as explained later, the entire remote clock is mechanically non-responsive to signal reset pulse energization of winding 30*c*.

The lockout means may assume a variety of forms. As illustrated here in diagrammatic form, spindle 30*a* has enlarged head 34 at its free end. Plate 34*a* is rockable about pivot rod 34*b* which is laterally offset from and parallel to arbors 19 and 27. In practice, arbors 14, 19 and 27 will be parallel and preferably coaxial with arbor 14 lying within hollow arbor 19 and this in turn lying within hollow arbor 27 in customary clock design. The various arbors are shown as illustrated for clarity. Rocking plate 34*a* is normally biased by spring 34*c* to be clear of spindle 30*a* in which position head 34 can slide under plate 34*a*. However cam followers 35*a* and 35*b*, independently rockable about axis 35*c* extend over plate 34*a* and are urged downwardly against plate 34*a* by springs 35*d* and 35*e*. As will be explained, cam followers 35*a* and 35*b* have their positions controlled by timing cams on minute and hour arbors respectively. The mechanism illustrated has either or both cam followers 35*a* and 35*b*, when dropped sufficiently low, move plate 34*a* down against spindle 30*a* and lock head 34 against longitudinal movement in response to solenoid energization. It is understood that springs 35*d* and 35*e* are stronger than spring 34*c* and permit the lockout action to occur as described. The mechanical arrangement for cooperation between slidable spindle 30*a* (and head 34) and cam followers 35*a* and 35*b* is particularly advantageous for a number of reasons. Thus the drag of the follower tips on the edges of cams 40 and 39, to be described, can be made quite light and will be substantially the same whether the cam followers are in dwell or out of dwell. Furthermore any pull on spindle 30*a* due to solenoid energization, irrespective of whether spindle 30*a* responds or not, will have no effect on cam followers 35*a* and 35*b*. In an actual clock, cam followers 35*a* and 35*b* may be of rather thin stock so that a side force would bend one or both followers. In such case, the close spacing between gears might force a follower laterally against a gear to create a serious drag or catch in a gear tooth. It also avoids trouble under certain conditions of follower rise.

The reset call or reject portion of the remote clock includes generally circular cams 39 and 40 on minute arbor 19 and hour arbor 27 respectively. The cams as illustrated are discs having cam edges. Cam 39 has dwell 39*a* shaped so that the leading drop end is steep and the trailing end is gradually rising. Similarly, cam 40 has dwell 40*a* with a steep leading drop end and a gradually rising trailing end. Followers 35*a* and 35*b* have cam follower tip portions which ride on the respective cam edges for quick and accurate cam drops. The cam followers are spring biased against the cam edges.

The means for obtaining accelerated reset clock drive comes into operation only when armature 30*b* is able to physically move in response to the magnetic pull created when winding 30*c* is energized by a signal pulse from the master clock. The magnetic field created by winding 30*c* tends to pull armature 30*b* in the direction indicated by the arrow in FIG. 1. Armature 30*b* can move in response to the solenoid energization when head 34 of spindle 30*a* is able to move underneath rocking plate 34*a* as shown in FIG. 1B. Rocking plate 34*a* can rock to permit spindle head 34 to move thereunder only when the rocking plate is free to respond to the bias of spring 34*c* and this can only occur when both cam followers 35*a* and 35*b* are out of the dwells and ride along the edges of the two timing cams.

Assuming that the interlock permits longitudinal travel of armature 30*b*, auxiliary drive gears 30 and 32 will be moved into engagement with gears 12 and 21 respectively. Friction clutch 31 will permit slippage to occur between spindle 30*a* and gear 32 in the event that either of gears 30 or 32 is unable to mesh with gears 12 or 21 because of tooth conflict. The force on armature 30*b* is not strong enough to cause binding and, as a rule, either or both of these gears 12 and 21 will turn sufficiently so that after a slight delay, meshing of gears 30 and 12 on the one hand and gears 32 and 21 on the other hand can occur. If desired, gear 30 may be wide enough so that it will remain in mesh with gear 12 at all times and gear 32 may be the only gear to be moved by armature 30*b* when reset is to occur.

The movement of gear 32 in a direction parallel to the length of the axis of spindle 30*a* actuates means for stopping seconds arbor 14 and minutes arbor 19 in predetermined oriented positions so that when reset stops, the two arbors and clock hands can start from predetermined positions. This stopping means is provided by the following mechanism. Gear 32 has fork 50 provided with tines 50*a* and 50*b* straddling the gear, the tines extending inwardly beyond the gear edges in the general direction of the gear axis. Fork 50 is carried by and rigidly secured to pin 51 extending along a line perpendicular to and laterally offset from the axis of spindle 30*a*. Pin 51 is suitably secured in a mounting block carried by the clock housing and illustrated in FIGURE 6 in connection with the practical construction as block 151*a*. Fork 50 is biased by spring 52 so that tine 50*a* bears against the face of gear 32 and biases spindle 30*a* to an inactive position illustrated in FIG. 1. Pin 51 carries actuating arm 53 which cooperates with second fork 55 rockable about pin 51. Fork 55 has tines 56 and 57 extending generally parallel to each other and toward arbors 14 and 19.

Tine 56 of second fork 55 is movable, when gear 32 meshes with gear 21 to extend into the orbit of stop finger 14*b* secured on or rotatable with seconds arbor 14. When tine 56 is in a stopping position, finger 14*b* will be stopped at a predetermined rotary position. When this occurs, friction clutch 12*a* will slip, permitting seconds gear 12 to drive gear 30 without necessarily driving seconds arbor 14 and seconds hand 14*a*. Actuating arm 53 cooperates with part of second fork 55 to the left of the axis of pin 51, as seen in FIGS. 1 and 1A, and carries leaf spring 53*a* bearing against the part of fork 55 to the right of pin 51. A coil spring may be used instead of the leaf spring. This arrangement prevents fork 55 from being forced into active position during reset action in case of conflict between tine 56 and stop finger 14*b* or, as explained later, between tine 57 and stop finger 21*a*.

When fork 55 is rocked for engagement with seconds stop finger 14*b*, time 57, which is normally outside of the orbit of finger 21*a* on gear 21, will be moved into the orbit of such finger for stopping the same.

Fork 55 need not rock in the event that fingers 14*b* or 21*a* happen to be in a conflicting position in which case spring 53*a* will bias fork 55. Thus, the entire accelerated reset drive is provided with means for cushioning against mis-engagement of fork parts and stop fingers.

Finger 21*a* on gear 21 is properly oriented with respect to minute hand 19*a* so that when gear 21 is stopped, by finger 21*a* being engaged by tine 57, the minute hand will be in desired predetermined position.

Seconds gear 12 rotates at all times when motor 10 is energized. Until stop finger 14*b* is stopped by fork tine 56, drive gear 12 will turn clutch 12*a*, pinion 15 and stop finger 14*b*. When finger 14*b* is stopped, clutch 12*a* will slip and permit gears 15, 16, **16*a* and 17 to remain stationary. Gear 21 will be moved in a clockwise direction at an accelerated rate by auxiliary drive gear 32 until pin 21*a* stops this gear from rotating. Slippage at clutch 31 will now occur. Thus, when the auxiliary drive is operating, seconds stop finger 14*b* and minute stop finger 21*a* will each be independently stopped in predetermined oriented position. In practice, stop finger 14*b* will be stopped at the 00 second position so that when a signal pulse ends and auxiliary drive becomes inoperative, normal clock drive can begin at substantially the zero seconds position of the seconds hand. With respect to gear 21, this may be oriented with respect to the minute hand so that gear 21** is stopped at the desired minute, in this case 58 minutes past the hour.

The timing of the steep leading ends of cam dwells **39*a* and 40*a* is important and relative positions may be factory adjusted by slipping at friction clutch 23*a*. The trailing ends of the cam dwells have substantial latitude for timing. The angular extent of cam dwell 39*a* should be great enough so that the tip of follower 35*a* can remain at dwell for the duration of a reset pulse (57 seconds in this instance) plus 10 or 15 seconds additional to permit the remote clock, if desired, to be that far behind the master clock without reset to allow for manufacturing tolerances in end shake, gear backlash, etc. For a 57 second pulse duration, cam dwell 39*a* should have an angular dwell of about 7 or 8 degrees (corresponding to say 1¼ minutes of clock time) and less than about 10 degrees so that follower 35*b* can drop just prior to a signal pulse and be up from dwell well within one minute of clock time after the end of the 57 second pulse. Hour cam dwell 40*a* (this cam turns much slower than minute cam 39) should permit follower 35*a*** to dwell over the long 5 o'clock reset period. In the signal pattern here, the hour cam dwell should have a time extent of about 25 minutes to allow for tolerances. This would involve a dwell angle of the order of 12 degrees for the signal pattern here. With the signal pattern given here by way of example, it is desirable for the hour cam dwell to terminate at no more than 35 minutes after the long reset hour (in this instance 5:35:00). This particular dwell range (from about 25 to 35 minutes) is ample for manufacturing tolerances.

Minute cam 39 should have a cam dwell lead time (with respect to onset of a master clock reset signal period) of the permissible clock error to be tolerated without reset action. In the present instance, if 15 seconds behind the master clock without reset is to be tolerated, then minute cam 39 must have follower **35*b* drop in the cam dwell at least 15 seconds ahead of the reset signal period for the remote clock time. A second or two added lead time can be provided. It should be noted that if either minute or hour interlock followers is in dwell, solenoid operation is prevented and no reset can occur. It should also be noted that hour cam follower 35*a*** drops only once every 12 hours in this signal pattern.

The relative timing between the minute and hour cam dwells is not critical. Care should be taken to prevent hour cam follower **35*a* from dropping into the cam dwell more than a few seconds prior to the drop of the minute cam follower into the minute cam dwell. Hour cam follower 35*a*** can follow the minute cam follower in dropping into their respective dwells by 15 or 20 seconds. It is understood that this relative timing comes into play only at the beginning of a long reset period (4:58:00). The duration of the long reset period (4:57:03–5:20:00) is in part dictated by providing almost complete reset under the greatest possible difference between master and remote. Such an operating characteristic is generally desirable for sales purposes.

The dimensional extent of the cam dwells for the minute and hour cams does not require accuracies greater than can be obtained with conventional manufacturing techniques (stamping, moulding). The various parts including the cams will generally be of brass or any other desired metal or may be moulded of plastic. In a practical clock embodying the invention, the cam diameters may be of the order of about one inch and tolerances to within about .001 or .002 inch may be readily maintained. The adjustment of the relative positions made possible by the provision of friction clutches permits of timing adjustment of cam dwell drops with a high degree of accuracy. As has been previously pointed out, generous tolerances for the trailing ends of the minute and hour cam dwells are possible.

As an example, a remote clock embodying the present invention had the following reset characteristics based upon the time signal pattern herein disclosed and with the remote clock having substantially maximum departure from master clock time.

CLOCK CORRECTION SEQUENCE

Assume: Secondary Clock Reads: 5:45:23 (approx. 11 hours slow)

Master Clock Reads: 4:57:03

| | Master Clock Reads | | Secondary Clock Reads | |
|---|---|---|---|---|
| | Pulse Start | Pulse End | Pulse Start | Pulse End |
| Pulse: | | | | |
| 1 | 4:57:03 | 4:58:00 | 5:45:23 | 5:58:00 |
| 2 | 4:59:03 | 5:00:00 | 5:59:03 | 6:58:00 |
| 3 | 5:01:03 | 5:02:00 | 6:59:03 | 7:58:00 |
| 4 | 5:03:03 | 5:04:00 | 7:59:03 | 8:58:00 |
| 5 | 5:05:03 | 5:06:00 | 8:59:03 | 9:58:00 |
| 6 | 5:07:03 | 5:08:00 | 9:59:03 | 10:58:00 |
| 7 | 5:09:03 | 5:10:00 | 10:59:03 | 11:58:00 |
| 8 | 5:11:03 | 5:12:00 | 11:59:03 | 12:58:00 |
| 9 | 5:13:03 | 5:14:00 | 12:59:03 | 1:58:00 |
| 10 | 5:15:03 | 5:16:00 | 1:59:03 | 2:58:00 |
| 11 | 5:17:03 | 5:18:00 | 2:59:03 | 3:58:00 |
| 12 | 5:19:03 | 5:20:00 | 3:59:03 | 4:58:00 |
| Single | 5:57:03 | 5:58:00 | 5:35:03 | 5:58:00 |

It will be observed that the master clock time is at the beginning of the long 5:00 o'clock reset period. Since the remote or secondary clock is off with respect to the master clock both in minutes and hours, the remote clock will call for reset. At the end of the first 57 second reset pulse, minute reset will occur with the secondary clock advanced almost 13 minutes during 57 seconds of pulse duration. The remote clock at the end of the first 57 second reset pulse is now 11 hours behind the master clock with the minute hands of both remote and master clock in time with each other.

Between the end of the first pulse and the beginning of the second pulse from the master clock, 63 seconds elapse so that at the beginning of pulse 2, the remote clock is still 11 hours behind the master clock. However, this second pulse causes the remote clock to advance 58 minutes and 57 seconds so that at the end of the second pulse, the remote clock is 10 hours and 2 minutes behind the master clock. Between each of the successive pulses, there is a 63 second no reset period so that at the end of the twelfth pulse in the long reset cycle, the remote clock is advanced almost 1 hour for each pulse and at the end of the twelfth pulse, the remote clock is now 22 minutes behind the master clock.

Due to the time of the reset signals immediately before an hour, the final correction shows the remote clock just prior to 5:00 o'clock when the master clock shows at 5:20:00. At this twelfth pulse, the long reset cycle has ended. The succeeding single reset pulse after the so-called "5:00 o'clock" long reset now occurs at 5:57:03 and runs to 5:58:00. At 5:57:03, the remote or secondary clock has advanced to 5:35:03 and is calling for minute reset. The 12 minute and 57 second difference between the remote clock and master clock (the remote clock is still slow) is well within the ability of complete minute correction of the remote clock for one 57 second reset pulse. Therefore, complete correction of the remote clock will occur with the single reset pulse from the master clock following the end of the long 5:00 o'clock reset period.

It will be noted that the remote clock showing 5:35:03 at the beginning of the first reset pulse after the long reset requires that the hour interlock finger must be out of the hour cam dwell to permit minute hand correction of less than an hour. If the hour lockout finger is still in dwell at that time, no reset is possible even though the minute interlock finger is out of the dwell and is calling for reset.

If the remote clock had started being slow less than 11 hours (say 5 or 6 hours) then hour reset action would have stopped at the pulse when the remote clock would be less than 60 minutees behind the master. Thereafter additional reset pulses in the long "5:00 o'clock" reset period would not call for reset since the hour cam would lock out reset action for such additional pulses.

A system embodying the present invention and utilizing the general reset signal pattern wherein one long hour reset (5:00 o'clock period) and single hourly reset pulses are provided should have the minute and hour cam dwells so arranged that: (1) Assuming the remote clock is on time with the master clock, minute cam lockout (no reset) should occur for a 57 second pulse arriving about several seconds before the onset of a reset pulse from the master clock.

(2) Again assuming that the remote clock is on time with the master clock, hour cam lockout (no reset) should occur when a remote clock reads about 4:57:03 and before 4:59:03. With the hour cam, assuming the remote clock is on time with the master clock for both hour and minute, lockout of the remote clock will occur during the first 57 second signal pulse coming at 4:57:03 (master clock time) and will last for the duration of the 57 second pulse. 4:59:03 will be the time when the second pulse of the long reset (master clock time) arrives. By that time the minute cam will no longer have any effect on lockout and if the hour cam does not call for reset at 5:59:03, then lockout will be provided with the reset beginning with the second pulse during the long series of pulses (at 5:00 o'clock). Successive pulses during this long signal reset period will fail to provide reset so long as the remote clock hour cam is in correct position for lockout, this indicating no reset necessary.

In the event of power failure upon resumption of power, many different patterns of operation may result if power goes on during a long reset time. In all cases, the remote clock will finally be reset, assuming that the master clock is correct, either because it has not stopped or has been manually reset.

Figures 2, 4, 5:
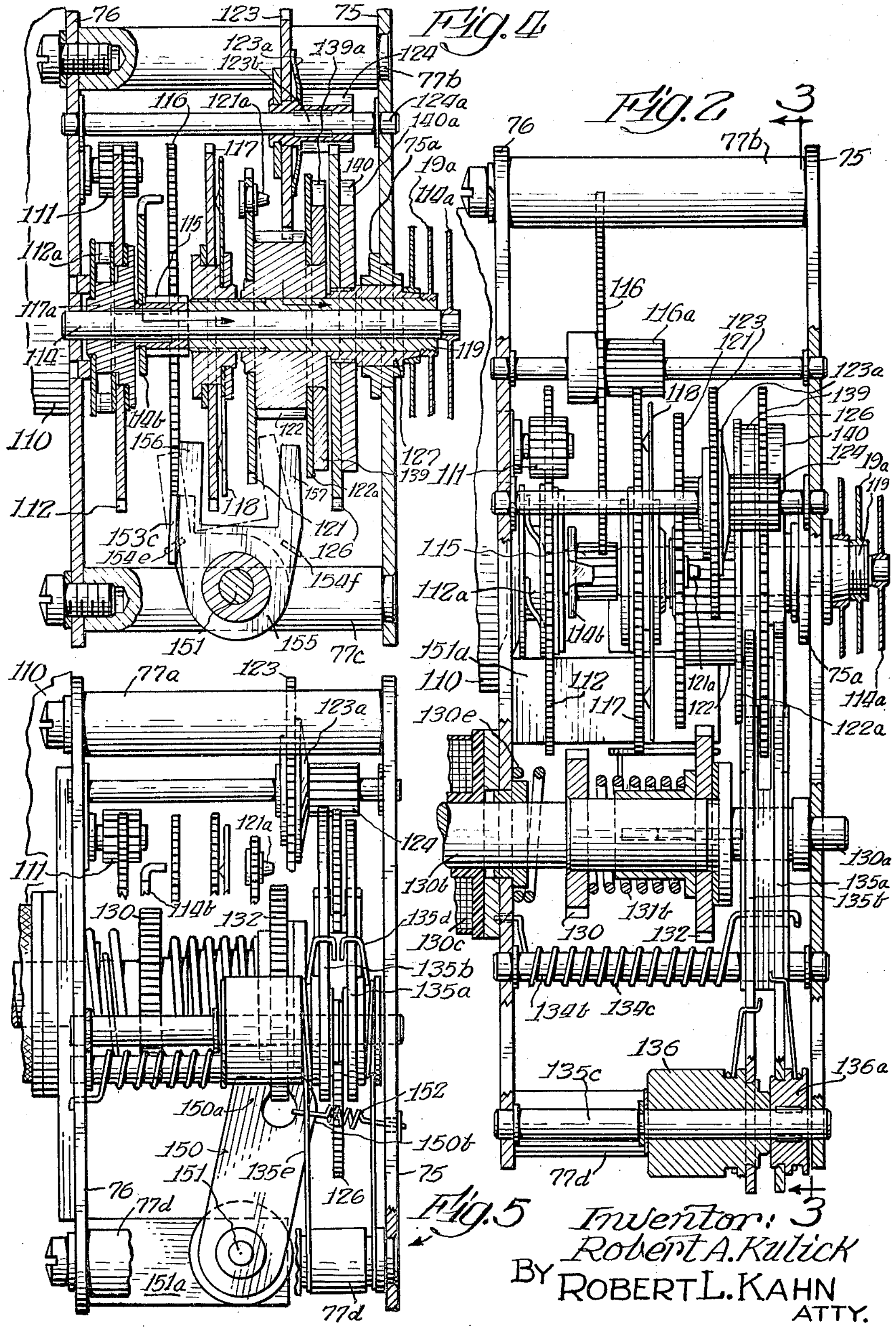
FIG. 2 is a sectional view of a clock embodying the present invention, this view being taken along line 2—2 of FIG. 3.
FIG. 4 is a sectional view along line 4—4 of FIG. 3.
FIG. 5 is a sectional view along line 5—5 of FIG. 3.

The clock system described in connection with FIG. 1 may be embodied in various mechanical structures. One practical embodiment illustrated in the drawings beginning with FIG. 2 will now be described. Mechanical elements from the practical embodiment which correspond substantially to mechanical elements in FIG. 1 carry numerals which are one hundred more than the corresponding numerals in FIG. 1. Insofar as clutches are concerned, arrangements usual in the clock art are used. For example, in FIG. 1 clutches 12*a*, 18, 23*a* and 31 are designed to utilize conventional clock technique or to permit compact arrangement of parts.

The entire clock, including an electric motor is supported by front and rear plates 75 and 76 maintained in spaced parallel relation by sleeves 77*a* to 77*d* inclusive. The sleeve ends are secured to the plate corner portions by staking or small bolts, this being customary in the clock art. The various shafts and spindles pass through registering openings in the plates. Electric motor 110 is secured at the outside of rear plate 76, the shaft carrying gear 111 passing through an opening in rear plate 76. Seconds arbor 114 is journalled in rear plate 76 and extends through front plate 75. Minute sleeve arbor 119 is disposed over arbor 114 and extends for a portion of the distance to rear plate 76. Hour sleeve arbor 127 is disposed over sleeve arbor 119 and stops short of rear plate 76, as will become apparent later. The 3 concentric arbors extend forwardly of front plate 75 for different distances to permit seconds, minute and hour hands to be attached to the respective arbors. Hour sleeve 127 is journalled in bearing 75*a* carried by front plate 75.

Seconds gear 112 is coupled through spring friction clutch 112*a* secured to seconds arbor 114. Stop finger 114*b* and pinion 115 are adjacent each other and locked to seconds arbor 114. Going forwardly toward front plate 75, minute drive gear 117 is loosely supported on mounting sleeve 117*a*. Sleeve 117*a* carries securely attached thereto spring clutch member 118 pressing against minute drive gear 117. Clutch member 118 is firmly secured to sleeve 117*a* and this, in turn, is firmly secured to minute arbor 119. Minute arbor 119 carries frmly secured thereto minute reset gear 121 upon which is mounted stop finger 121*a*. Minute reset gear 121 is next to and firmly secured to minute pinion 122. On the forward side of pinion 122 there is disposed minute retaining disc 122*a* whose diameter is greater than that of pinion 122. Minute cam disc 139, retainer disc 122*a*, drive pinion 122 and minute reset gear 121 are all secured to rotate with minute arbor 119. It should be noted that the diameter of cam 139 is somewhat less than the diameter of retainer disc 122*a*. The purpose of this will be explained in connection with the cam followers.

Forwardly of minute cam 139 but not rotatable therewith is hour gear 126 whose diameter is larger than that of minute cam disc 139. Hour gear 126 and hour cam 140 are both secured to hour arbor 127. Hour cam 140 has a diameter substantially equal to minute cam 139, both of these being generally circular and having cam drops 139*a* and 140*a* similar to the cams illustrated in FIG. 1. Gears 116 and 116*a* are secured to rotate together on spindle 116*b* supported between plates 75 and 76.

Gear 123 and gear 124 have between them stiff spring clutch 123*a*. The clutch and gears are disposed on spindle 124*a* journalled in the front and rear plates 75 and 76. It is immaterial whether gear 123 or gear 124 is rotatively coupled to spindle 124*a*. The important thing is that gears 123 and 124 and friction clutch 123*a* maintain the two gears in desired relationship so that these gears mesh with gears 122 and 126 and that friction clutch 123*a* be stiff enough so that under all operating conditions, the clutch will maintain the two gears rotatively coupled. By means of special tools, gears 123 and 124 may be slipped with respect to each other for satisfactory adjustment. This slipping of clutch 123*a* permits proper relative timing adjustment between the minute and hour cams and hands as has been previously explained in connection with friction clutch 23*a* in FIG. 1.

Referring now to minute and hour cams 139 and 140, cam followers 135*a* and 135*b* cooperate with these cams. Cam followers 135*a* and 135*b* are flat pieces of metal, usually brass, whose width is rather substantial and whose thickness is the same general order of thickness as the cam discs with which they normally cooperate. The thickness dimension of the cam followers is parallel to the axis of the various arbors and the two followers are mounted for rocking about pin 135*c* supported in the front and rear plates. Cam follower 135*b* is securely attached to sleeve 136 which is rotatively carried by pin 135*c*. Similarly cam follower 135*a* is attached to sleeve 136*a* rotatable about pin 135*c*. By having these sleeves for the cam followers, the cam followers may be more easily guided so that they can rock about pin 135*c* with minimum side play. Due to the relative diametral sizes of retainer discs and gear 126, the ends of the cam followers resting upon the edges of the cams lie between guiding walls so that lateral movement of the ends of the cam followers adjacent the cam discs is prevented.

Springs 135*d* and 135*e* are provided as illustrated in the drawings. Thus spring 135*d* has one end thereof looped about sleeves 77*d* for anchoring and has a number of coils disposed about sleeve 136*a* and finally ends up with the end of the spring disposed over the top edge of cam follower 135*a*. Similarly spring 135*e* is arranged in a corresponding manner to operate on cam follower 135*b*. These springs urge the cam followers against the edges of the cam discs.

Figure 3:
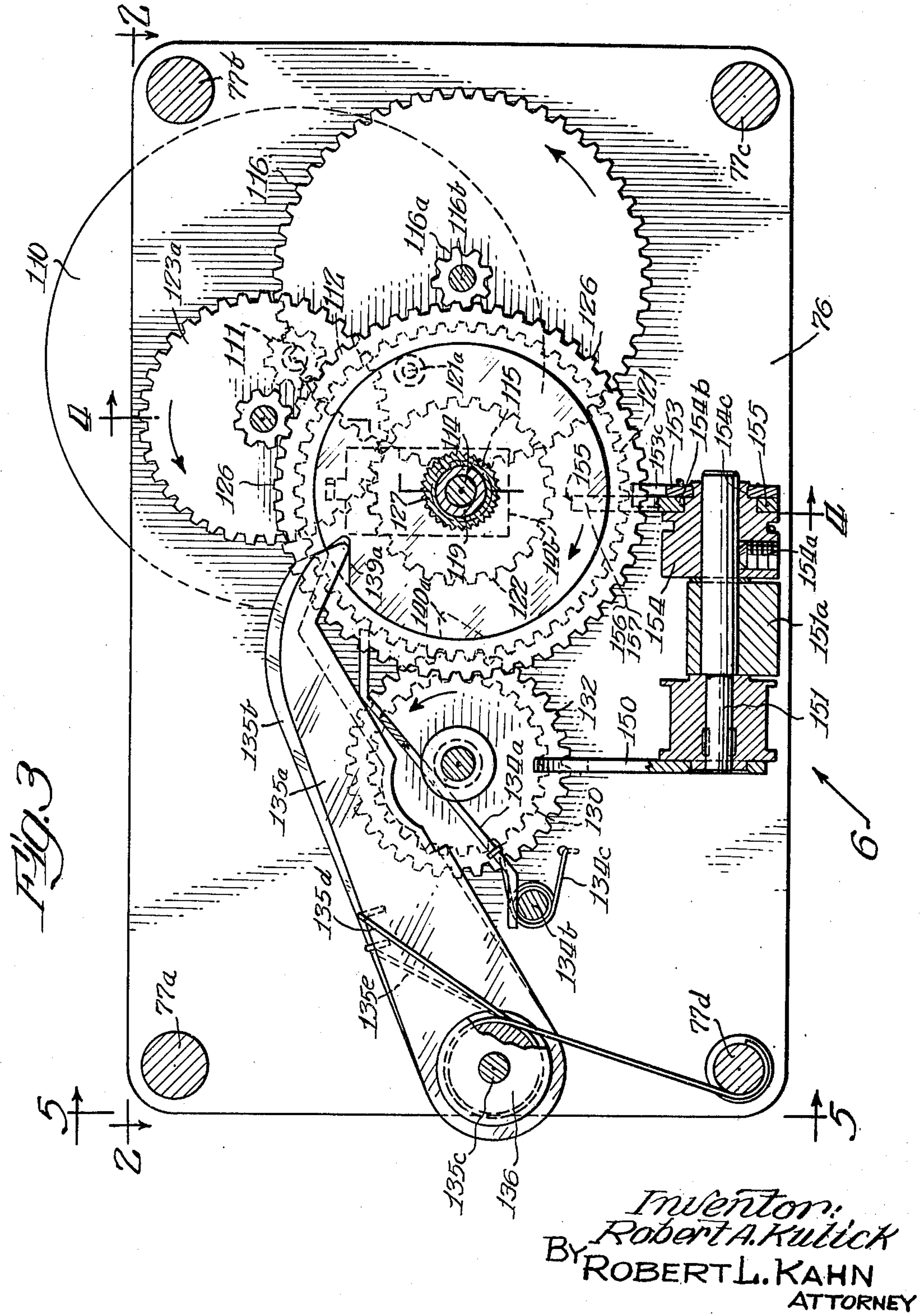
FIG. 3 is a view partly in section along line 3—3 of FIG. 2.

Rocking plate 134*a* rockable about pin 134*b* is provided. Pin 134*b* is journalled between the front and rear plates and has coil spring 134*c* disposed about the pin with one end anchored in rear plate 76 and the forward end extending underneath rocking plate 134*a*. Coil spring 134*c* is just strong enough to keep plate 134*a* against the edge of a cam follower and by itself cannot raise a follower clear of the cam edges. The lower edge as seen in FIG. 3 of the two cam followers is so shaped as to cooperate with the elements movable in connection with lockout. Thus, in this particular example, either or both cam followers will provide for lockout action when the cam drops are in proper position. It is, of course, possible to reverse the arrangement so that the active portion of a cam disc is a rise instead of a drop.

Referring now to the means for activating the supplemental drive through gears 130 and 132, gear 130 is firmly secured to rod 130*b*. Rod 130*b* is of soft steel and part thereof can function as an armature. Coil spring 131*b* over rod 130*b* is disposed between gear 130 and shouldered sleeve 132*a* of nylon or the like. Shouldered sleeve 132*a* is movable along rod 130*b* and presses against the side of gear 132, loosely disposed on rod 130*b*. Gear 132 is forced against compressible washer 132*b* of nylon or other suitable material held against shoulder 132*c* of rod 130*b*. Thus gear 132 is frictionally coupled to rod 130*b* but can slip with respect thereto.

The solenoid, not shown in full, is conventional in having a bobbin with a winding thereon, the armature part being free to move therein. The solenoid structure is bolted to the rear face of rear plate 76 and the armature and stop corresponding to part 30*d* of FIG. 1 is similar to that shown in FIG. 1. Spring 130*e*, corresponding to spring 30*e* in FIG. 1 is disposed between gear 130 and the face of rear plate 76. Spring 130*e* normally is short enough so that desired movement of rod 130*b* can occur before 130*e* is compressed. The lateral offset of either or both of gears 30 and 32 (depending upon whether only one or both gears are movable into and out of mesh with gears 12 and 21 for FIG. 1 and the corresponding gears for embodiment illustrated in the drawing beginning with FIG. 2) should be great enough so that the armature, in response to solenoid energization, will be unloaded during initial motion to permit the magnetic pull on the armature to build up to a desirable value.

Figures 6, 7:
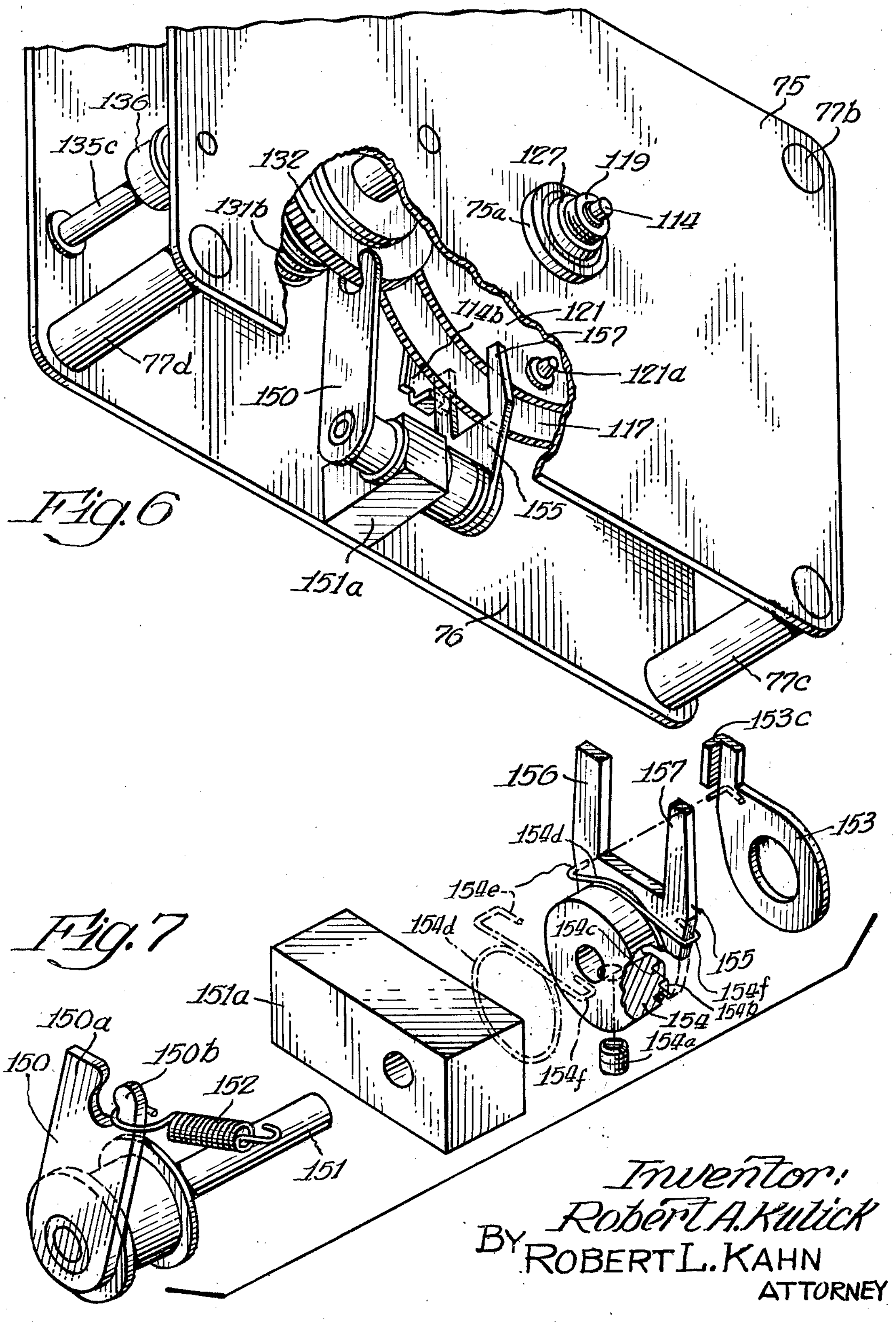
FIG. 6 is a perspective detail with certain parts broken away looking along arrow 6 of FIG. 3.
FIG. 7 is an exploded perspective of the various parts making up the stop fork transfer assembly.

The general arrangement of the gear shifting means shown in enlarged detail in FIGS. 6 and 7 is, for the most part, similar to the mechanism illustrated in FIG. 1 and described in connection therewith. Thus, fork 150 having tine 150*a* and 150*b* is rigidly secured to rocker pin 151 journalled in mounting block 151*a* bolted to rear plate 76. Coil spring 152 has one end looped about tine 150*b* and the other end anchored to front plate 75 (see FIG. 5). Rocker pin 151 passes into body 154 secured thereto by set screw 154*a*. Body 154 has shoulder 154*b* upon which fork 155 is loosely mounted. Fork 155 has tines 156 and 157. Actuating arm 153 is disposed over shoulder 154*c* and firmly secured to body 154 by upsetting the metal. Actuating arm 153 has arm portion 153*c* shaped to engage the outer edge of fork tine 156. Coil spring 154*d* has hooked ends 154*e* and 154*f* for engaging the outer edges of actuating member 153 and tine 157. The arrangement for fork 155 permits driving gear shifting if either tine of fork 155 is blocked.

While the remote clock disclosed herein is useful with master clocks generally, it may be used independently thereof with manually controlled signal switching.

What is claimed is:

1. A remote electric clock for use with a master clock and electrically connected thereto for receiving electric pulses from such master clock for reset in accordance with a prescribed reset signal pattern, said remote clock including a synchronous motor to be energized from a convenient source of monitored A.C. for timekeeping and power purposes, a gear train including slip clutches driven by said motor and having seconds, minute and hour arbors respectively for association with means for indicating seconds, minutes and hours, an auxiliary gear drive including a slip clutch for coupling between one gear on said gear train no further from said motor than a seconds gear and another gear on said minute arbor, said auxiliary gear drive having a suitable gear ratio for accelerating rotation of the minute arbor during clock reset, a winding for receiving electric reset pulses from a master clock, an armature for cooperation with said winding, means for supporting said armature for limited movement between active and inactive positions, mechanical means coupling said armature and said auxiliary gear drive, said armature when in inactive position having said auxiliary gear drive inactive and when in active position having said auxiliary drive active to provide reset, means for biasing said armature to an inactive position from which said winding, when energized, will tend to move said armature toward an active position, means operated by armature movement to active position for stopping the seconds and minute arbors respectively to predetermined restart positions incident to clock reset, said arbor stopping means being inoperative when said armature is in inactive position, two cams coupled for rotation in timed relation with said minute and hour arbors respectively, each cam having at least one actuating portion, the number, extent and orientation corresponding to a prescribed reset signal pattern, a follower for each cam, each cam actuating portion and follower providing for quick accurate follower response marking the leading end of an actuating portion, and mechanical interlock means coupling each cam follower and said armature for preventing armature movement from inactive to active positions upon winding energization when either cam follower is at the actuating cam portion at the time of such winding energization whereby a remote clock, in time with its master clock, will not have, in response to a master clock reset pulse, any mechanical movement, said failure of armature movement during winding energization being indicative generally of satisfactory remote clock performance when considered over a time interval depending upon the particular reset signal pattern and substantially reducing physical wear and tear of the remote clock mechanism.

2. The construction according to claim 1 wherein said armature is part of an elongated rigid member carrying at least one auxiliary drive gear, said winding for receiving electric reset pulses cooperating with said armature to provide a solenoid structure, said armature when moving in response to winding energization travelling into the solenoid interior to assume its active position.

3. The construction according to claim 1 wherein each of said two cams has a dwell as the actuating portion, said dwell having a steep drop at the leading end and a gradual rise at the trailing end.

4. The construction according to claim 3 wherein said cams are disposed in laterally offset relationship with the followers in laterally offset relationship, said mechanical means coupling said armature and auxiliary gear drive including an elongated member mounted for longitudinal travel and including an enlarged portion and means actuated by either cam follower for moving said elongated member into locking position to engage said enlarged portion when a cam follower is in dwell.

5. The structure according to claim 4 wherein said longitudinally movable member and said armature form one elongated member and wherein said winding is part of a solenoid construction with said armature being movable axially of said solenoid, said armature being subject to a force when said winding is energized tending to pull said armature into said solenoid.

6. A remote electric clock for use in an electric clock system including a master clock, said remote clock being adapted to receive mechanical power from an electric motor for clock operation and reset, said electric clock comprising a clock movement including a gear train having a mechanical power input from an electric motor for driving conventional time indicating means, an auxiliary gear drive shunting a portion of said gear train and having a suitable gear ratio to provide an accelerated drive to said time indicating means for reset purposes, said auxiliary gear drive including at least one gear movable into either of two positions, one position being an inactive position where said auxiliary gear train is inoperative, the other position being an active position for said accelerated clock drive, spring means biasing said one gear to a normal inactive position, a pair of cams in the clock gear train and driven respectively at rates corresponding to a minute and hour indicating means, each cam having a predetermined cam follower actuating portion, a cam follower for each of said cams, means including an electro-magnet having an armature for creating a force to move said gear to an active position, said electromagnet including a winding normally connected to receive reset signals from the master clock, and interlock means between said armature and cam followers for preventing armature movement when a cam has a predetermined orientation in connection with its cam follower, whereby said remote clock is responsive to a reset signal by physical movement only when a cam orientation is incorrect at the onset of a signal pulse to said winding, said remote clock otherwise being physically quiescent to master clock reset signals when such remote clock is running true.

7. The construction according to claim 6 wherein stop fingers rotatable with second and minute gears are provided, a fork having tines normally clear of the orbits of said stop fingers but movable into the orbits of such stop fingers, and means connected between said one movable gear of said auxiliary gear train and said fork for moving said fork tines from a normally clear position to a finger stopping position whereby upon occurrence of reset, said second and minute fingers are stopped at predetermined oriented positions, said construction including slip clutches for permitting reset action to occur, there being one slip clutch between the seconds gear and an arbor carrying the seconds gear and an additional slip clutch between the minute gear and an arbor carrying the minute gear.

8. The construction according to claim 7 wherein said means between said movable gear and fork includes a second fork, and spring means disposed between said two forks for biasing said two forks to move together, said spring means permitting said first fork to remain in a normally inactive position even though said second fork has been moved to an active position to accommodate any temporary inability of gears to mesh.

9. The construction according to claim 6 wherein each cam is a disc with the disc edge functioning as a cam surface, suitably shaped for cam action, means for mounting said two cams about a common axis, each cam follower comprising an arm with both followers being rockable about a common axis parallel to and laterally offset from the cam axis, means for biasing said cam followers to engage the cam edges, said interlock means including a plate rockable about an axis parallel to and laterally offset from the rocking axis of the two cam followers, said plate being disposed so that in certain cam positions both cam followers can rest thereon, said interlocking means also including a headed member attached to said armature and movable therewith along a line which is parallel to and laterally offset from the plate rocking axis, said headed member when said armature is in a normal position engaging a part of said rocking plate when at least one of said cam followers is in a position for interlock action in response to a signal pulse.

10. A clock movement for actuation by an AC synchronous motor useful in a system having a master clock and at least one remote clock with a communication channel therebetween for transmission of clock reset signals from the master to remote at predetermined time intervals in a predetermined signal pattern, said clock movement being for a remote clock and including front and rear plates in parallel, laterally offset relation, a seconds arbor extending between said two plates and journalled for rotation, a seconds gear on said arbor, a friction clutch between said arbor and seconds gear for coupling the two, a pinion and a seconds stop finger secured to said arbor for rotation therewith, a minute arbor over said seconds arbor adjacent said stop finger and extending through said frontplate, a minute drive gear, reduction gearing supported by said plates and coupled between said pinion and minute drive gear, a minute reset gear, said two minute gears being coaxial over said minute arbor and having a friction coupling therebetween, said reset gear only being rotatable at all times with said minute arbor, a minute stop finger rotatable at all times with said minute arbor, a pinion on said minute arbor rotatable therewith at all times, a disc minute cam on said minute arbor and rotatable therewith at all times, an hour arbor over said minute arbor journalled in said front plate and extending rearwardly toward but stopping short of said minute cam, a gear for said hour arbor and rotatable therewith at all times, an hour disc cam over said hour arbor and rotatable therewith at all times, reduction gearing supported between said plates for coupling between said pinion on said minute arbor and said hour gear, an auxiliary drive spindle supported between said plates, a pair of coaxial gears mounted on said auxiliary drive spindle and rotatively coupled to each other through a friction clutch, said gears being so dimensioned and positioned between said plates than when functioning as an auxiliary drive, said seconds gear can drive the minute reset gear at an accelerated rate for clock reset, at least one of said auxiliary gears being movable along the auxiliary drive spindle axis for activating the auxiliary drive, a solenoid having an armature normally movable in response to solenoid winding energization, means coupling said armature to said movable auxiliary gear for activating the auxiliary drive on armature movement, a fork having two tines normally inoperative, said fork being movable to an operative position where one tine is in the orbit of said seconds arbor stop finger for stopping the same and the other tine is in the orbit of the minute arbor stop finger for stopping the same, means responsive to movement of said armature for moving said fork, means biasing said armature to a normally inactive position with the auxiliary drive inactive and with the fork tines being inoperative, a cam follower for each cam disc, means for mounting said followers to be rockable about a common axis parallel to and laterally offset from the clock arbors, said followers riding on the edges of said cam discs, each cam having an active actuating portion for follower movement, a rocking plate rockable about an axis laterally offset from and parallel to the arbor axis and positioned and dimensioned to cooperate with either or both cam followers, spring means for biasing said followers against their respective cam edges, spring means for biasing said rocking plate against the cam followers, said last named spring means being insufficient to actuate a cam follower, and means secured to said armature for movement therewith to cooperate with the rocking plate for preventing armature movement in case at least one cam follower is at an active cam edge portion, whereby no reset action can occur if the clock is on time, the cam active portions being properly proportioned and oriented to provide such action.

11. The construction according to claim 10 wherein said reduction gearing between the minute arbor pinion and hour gear includes a stiff friction clutch for permitting adjustment between the minute and hour disc cams.

12. The construction according to claim 10 wherein said auxiliary drive spindle extends beyond the rear plate and carries said armature for cooperation with the solenoid winding, said auxiliary drive spindle also carrying a second fork for engaging the edge of said movable auxiliary drive gear, means coupling said two forks and including a spring whereby when said armature moves to active position, said second fork is moved with said auxiliary drive gear, said second fork applying force tending to move said first fork into active position through said spring to permit said first fork to respond to said force only when both tines thereof are free from clashing with both stop fingers.

13. The construction according to claim 12 wherein said auxiliary drive gears on said spindle are both movable laterally for meshing purposes, said auxiliary gear cooperating with said seconds gear being rotatable with said auxiliary drive spindle, the other auxiliary drive gear being frictionally coupled to the auxiliary drive spindle and cooperating with the minute reset drive gear.

14. The construction according to claim 10 wherein each of said disc cams is between members having larger diameters than said cams to provide side walls and wherein said cam followers each consist of a flat strip of material whose width is substantially greater than the thickness with the edges of the followers resting upon the cam edges whereby said cam followers are restrained from undesired lateral travel at the cam discs.

15. The construction according to claim 14 wherein each cam has a dwell as the active cam portion, said rocking plate cooperating with the follower edges and being free to respond to its own bias only when both cam followers are out of their cam dwells.

16. The construction according to claim 10 wherein a load spring is provided against which movement of said auxiliary drive spindle is utilized for providing added spring bias for restoring said armature from its active position toward its inactive position, said load spring being ineffective during initial armature movement in response to solenoid energization, said auxiliary drive being inactive during such initial armature movement whereby the solenoid pull on said armature can be great enough for initial armature movement without damaging pull thereon after initial armature movement has taken place and armature travel continues for reset action.

17. The construction according to claim 16 wherein said load spring comprises a coil spring about the auxiliary drive spindle, said coil spring being disposed between the rear plate and the auxiliary drive gear for cooperation with the seconds gear, said coil spring having a normal axial length less than the distance between the gear side and rear plate.

References Cited

UNITED STATES PATENTS

| | | | |
|---|---|---|---|
| 2,796,729 | 6/1957 | Black | 58—34 |
| 3,148,499 | 9/1964 | Tringali | 58—34 |

RICHARD B. WILKINSON, Primary Examiner

E. C. SIMMONS, Assistant Examiner

U.S. Cl. X.R.

58—26